Jan. 27, 1970  A. H. RAUCH  3,492,194
TEXTURED PLASTIC OVERLAY PANEL
Filed July 6, 1966

INVENTOR
AUGUST H. RAUCH
BY James M. Heilman
ATTORNEY.

United States Patent Office 3,492,194
Patented Jan. 27, 1970

3,492,194
TEXTURED PLASTIC OVERLAY PANEL
August H. Rauch, Lebanon, Oreg., assignor to U.S. Plywood-Champion Papers Inc., a corporation of New York
Filed July 6, 1966, Ser. No. 563,275
Int. Cl. B32b 3/00
U.S. Cl. 161—119        8 Claims

ABSTRACT OF THE DISCLOSURE

Covers a high quality embossed indented element comprising a fibrous substrate and a film adhered thereon and the process of manufacture. The process comprises embossing the fibrous substrate, thereafter applying a flat film to the embossed substrate and thereafter implanting the film in the indentations produced by the embossing step. A preferred technique is to implant the film in said substrate to depths greater than the depth produced by the embossing step.

---

The present invention is broadly concerned with an improved textured plastic overlay panel and with an effective method for the manufacture of the same. The invention is more specifically concerned with a fibrous or woody substrate or base as, for example, plywood, lumber, hardboard, particle board, etc. which has adhered to one surface thereof a plastic film or sheet which is embossed into the substrate or supporting panel by a novel technique.

It is known in the art to prepare supporting elements such as a fibrous material, a woody material and the like, and to adhere to one surface thereof a thin plastic film. This plastic film not only enhances the wearability of the supporting strata but also enhances its aesthetic value in that many hues and colors can be used. It is also known in the art to further improve the aesthetic appearance by embossing the plastic film into the structure of the supporting overlay using various patterns and designs. The embossing patterns may be of many designs and configurations, depending upon the desires of the buying public and the market value.

Plastic or film-surfaced panels, when installed as pointed out heretofore, have substantially greater durability and wearability and also have relatively low maintenance cost. No painting or repairing of the surface is required. Also, the life of the structural unit or element will be materially increased.

The film may be any type of suitable film and may be adhered to the panel by any adhesives and gluing techniques known in the art. A particularly desirable film for use in conjunction with the present technique is the film manufactured by the Du Pont Company and sold under the trade name "Tedlar." In essence, this film is a polyvinyl fluoride film which does not blister, peel, crack or rot and can be attained in many desirable hues and colors. Other suitable films are, for example, Videne (polyester film) and polyvinylchloride film, manufactured by Goodyear and Elm Coated Fabrics.

Heretofore, an embossed film overlaid substrate was accomplished by applying the film to the substrate and then forcing the film into the pattern desired down into the surface layer of the substrate with a roll or press, using enough pressure to actually crush or rupture surface cells of the underlying wood base substrate. However, this technique is not too successful for the reason that the hard summerwood grain present in most coniferous woods, particularly Douglas fir and southern pine, resist taking on the pattern of the embossing steel roll or press plate resulting in wide areas of depression as a unit rather than conforming to the desired pattern. This results in surface areas with flat, hard summerwood grain showing very little embossing and thus standing out as a defect wherever such hard grain happens to occur in an embossed section. Furthermore, voids in the core ply of ⅛" thick or larger and knotholes ¾" in diameter and larger show up after embossing as flat areas in the face ply of the substrate base with very little embossed pattern. This is due to the fact that without any solid core behind the face ply, the face veneer simply deflects aways from the steel embossing tool, effectively eliminating any appreciable amount of texturing in these areas.

In order to eliminate some of the problems inherent in the known mechanical technique of embossing of overlaid wood base products, one procedure of the present invention is to apply the film to the surface of a panel which previously has been machined to a desired pattern. The machining may be conducted so as to produce a series of hills and valleys in repeated desired designs or patterns as, for example, a design of one or two inches wide on modules of eight or sixteen inches. However, any desired design or recurring pattern may be used. The film is then applied to the machined substrate by suitable rollers or other means after application of a suitable adhesive to the substrate or film. The primary application of the film to the substrate is preferably accomplished with a flat face, rubber-covered roll compounded to take the requisite heat and laminating as, for example, silicone rubber. Following this, the film covering the premachined pattern or textured areas is rolled into place (hills and valleys) by rolls having surface patterns identical to the premachined areas.

This procedure is very successful on films having sufficient flexibility and elongation, along with thermoplasticity to readily conform and adhere to the configuration of the hills and valleys. However, in the case of other films, such as Tedlar (polyvinyl fluoride film) this procedure is not entirely satisfactory in that the film is not retained to the desired extent in the bottoms of valleys of the textured patterns. Films of these characteristics appear to resist stretching far enough to reach the bottom of the grooves, and do not adhere in the desired close configuration to the design of the machined supporting strata, so as to produce a very excellent and high quality embossed product.

In the technique described above, the standard groove is about ⅟₁₆ inch in depth and has a fairly straight slope from the bottom of the groove to the ridge or hump. In an attempt to secure the desired adherence of Tedlar or similar films to the substrate, the depth of groove was reduced to ⅟₃₂ inch using ⅛ inch frequency which gave a more gradual slope from valley to ridge. While this was an improvement, it still did not produce the desired uniformly high quality product.

In accordance with another preferred adaptation of the present invention, the grooves are premachined relatively shallow, such as about ⅟₆₄ inch as, for example, in the range from about 0.010 to 0.020 inch and in a configuration to secure a slope of about 15 degrees, for example, from about 10 to 45 degrees. The film is then applied to the machined substance as hereinbefore described.

In accordance with a preferred technique there is utilized a metal roll having the same pattern which is machined on the panel, but having greater projections than the depths of the machined grooves. Thus, for example, if the machined grooves on the substrate panel are ⅟₆₄ inch in depth, and the film adhered, a metal roll of the same pattern is then utilized except that the projections on the metal roll are substantially greater as, for example, of about ⅟₃₂ inch.

This procedure produces an excellent bond of the film to the panel and, furthermore, unexpectedly produces a groove depth greater than that machined on the panel prior to the application of the film by the metal roll. In other words, by forming the final laminating roll with larger ridges than used on the base embossing roll, a good contact between the plastic film and the base is secured throughout the panel.

The present invention may be more fully understood by reference to the drawings illustrating embodiments of the same.

Figure 1:
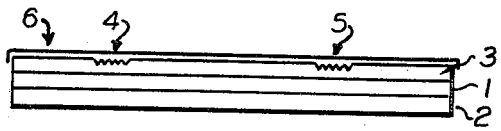
FIGURE 1 is an end view of a laminated or plywood panel.
Figure 2:
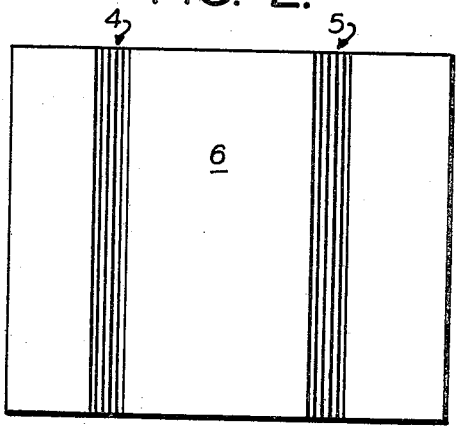
FIGURE 2 is a top plan view of the panel.
Figure 4:
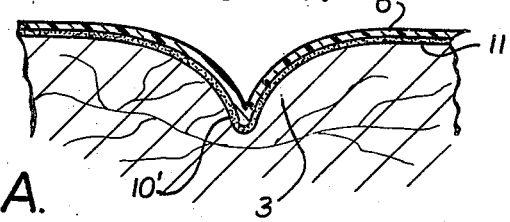

FIGURE 4 illustrates at 10' a further modified form in which the bottom of the valley is more narrow and sharp. Referring specifically to FIGURE 1, a core ply 1 is positioned between a back ply 2 and a face ply 3. Face ply 3 has two machined indentation strips or areas 4 and 5 running longitudinally with respect to the panel. The surface of face ply 3 is covered with a plastic film 6 which after fabrication extends into indentations 4 and 5.

Figure 3:
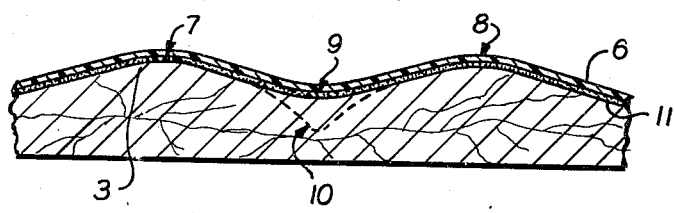
FIGURE 3 is an enlargement of a section of the patterned surface of one embodiment as at 9, and at 10 a different embodiment; the dotted line representing the final depth of the groove in the finished product as illustrated at 10 in FIGURE 3A.

Referring specifically to FIGURE 3, two peaks 7 and 8 are shown between which there exists a valley 9 which, by way of example, is about 1/64 of an inch below peaks 7 and 8. Peaks 7 and 8, as well as valley 9, are of 1/16 of an inch in radius. The distance between the peaks 7 and 8 is in the range of 1/8 to 3/8 while the slope between the valley and the peaks is about 15 degrees.

In accordance with the present invention, this configuration is secured in a first stage by a machining operation such as a gang cutterhead or gang saw arrangement, or embossing by a heated roller or heated platen. It is to be understood that the number and spacing of peaks and valleys may be varied appreciably in any one series and that the patterns may be repeated on any desirable modules as 4 inches, 8 inches, or 16 inches.

After machining to the desired configuration, adhesive 11 is then applied to the entire top surface of the face ply (or to the film) and the film is adhered thereto, preferably by use of a flat roll. In the second stage, a heavy metal roller of the same configuration as above is then applied to the plastic facing. In this adaptation the projections in the second stage are of the same length as the projections used to machine the substrate before the film application.

Figure 3A:
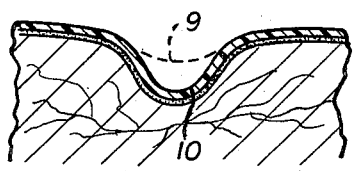

In a modified preferred adaptation, the projections on the roller are substantially in excess of the depth of the valleys 9 produced by the first embossing roller or cutterheads, and may be, for example, projections of about 1/32 of an inch. Under these conditions, particularly when using the above polyvinyl fluoride-type film, the film is very effectively force applied in the grooves of the face ply and a deep configuration, such as illustrated at 10 in FIGURES 3 and 3A and 10' in FIGURE 4, is secured. In other words, a deeper valley and more secure contact is established between the respective peaks in the FIGURE 3A modification.

A third embodiment is illustrated in FIGURE 4 wherein a relatively pointed projection on the embossing roll forces the plastic film into a narrow crevice where the film is retained.

Thus, in effect, the final groove imparted to the panel is secured in two operations. In the first operation a relatively shallow groove is imparted to the panel by machining prior to the application of the film. Glue is applied to either the substrate or the film, the film then applied to the substrate, and a machine roll of the same pattern is utilized except that the projections may be greater than the depth of the grooves. The film is set firmly in the grooves already machined in the panel and the grooves in the panel may be further deepened. In effect, this second operation wherein the grooves are deepened produces a superior bonding action, and in the modification of FIGURE 4 even a clamping action wherein the compressed wood will "spring back" after the embossing roll has moved on and retain the wedged film between the sides of the lower portion of the grooves. This produces a very high quality, excellent, durable product in which the film will be in contact with each portion of the grooved as well as ungrooved substrate.

The embodiments of the invention in which an exclusive property or privilege is claimed are defined as follows:

1. Embossed structural element which comprises a fibrous substrate having one face thereof machined to the desired configuration of indentations, a film adhered to said one face in a manner that along the slopes of the indentation the film is adhered thereto, and at the bottom of the indentation the film is clamped therein by portions of said structural element in their normal, undistorted position.

2. An element as set forth in claim 1 wherein the valleys of the indentations are narrow and the film is retained in said indentations by the spring-back of the sides of the indentations.

3. Improved process for the manufacture of a high quality embossed element comprising a fibrous substrate having adhered thereto a film which comprises in a first step machining said substrate to the desired embossed indented configuration, thereafter in a second step adhering the film to said substrate and in a third step implanting said film into said embossed indented configuration wherein the film will be securely clamped therein by the spring-back of the sides of the embossed area.

4. Process as defined by claim 3 wherein said film in said second step is adhered to said substrate in a flat manner without implanting said film into said embossed indented configuration.

5. Process as defined by claim 3 wherein said substrate is a plywood panel.

6. Process as defined by claim 4 wherein said film in said third step is implanted into said embossed indented configuration to depths greater than the depths of indentation produced in said first step whereby temporary compression of the wood will occur with subsequent return movement to securely clamp the film therein.

7. Process as defined by claim 6 wherein the depths of indentations in said first step are about 1/64 of an inch and wherein said film in said third step is implanted to depths of about 1/32 of an inch.

8. Process as defined by claim 6 wherein said fibrous substrate is a plywood board and said film is a sheet of polyvinyl fluoride plastic.

References Cited

UNITED STATES PATENTS

| | | | |
|---|---|---|---|
| 2,520,222 | 8/1950 | Stone | 161—119 |
| 2,978,006 | 4/1961 | Clemens | 156—219 |
| 3,228,823 | 1/1966 | Usala et al. | 161—186 |
| 3,265,556 | 8/1966 | Hungerford et al. | 156—324 |

MORRIS SUSSMAN, Primary Examiner

U.S. Cl. X.R.

156—209, 219